A. H. NORTH & J. B. H. LEONARD.
MACHINE FOR DRESSING CUTLERY-HANDLES.
No. 173,807. Patented Feb. 22, 1876.
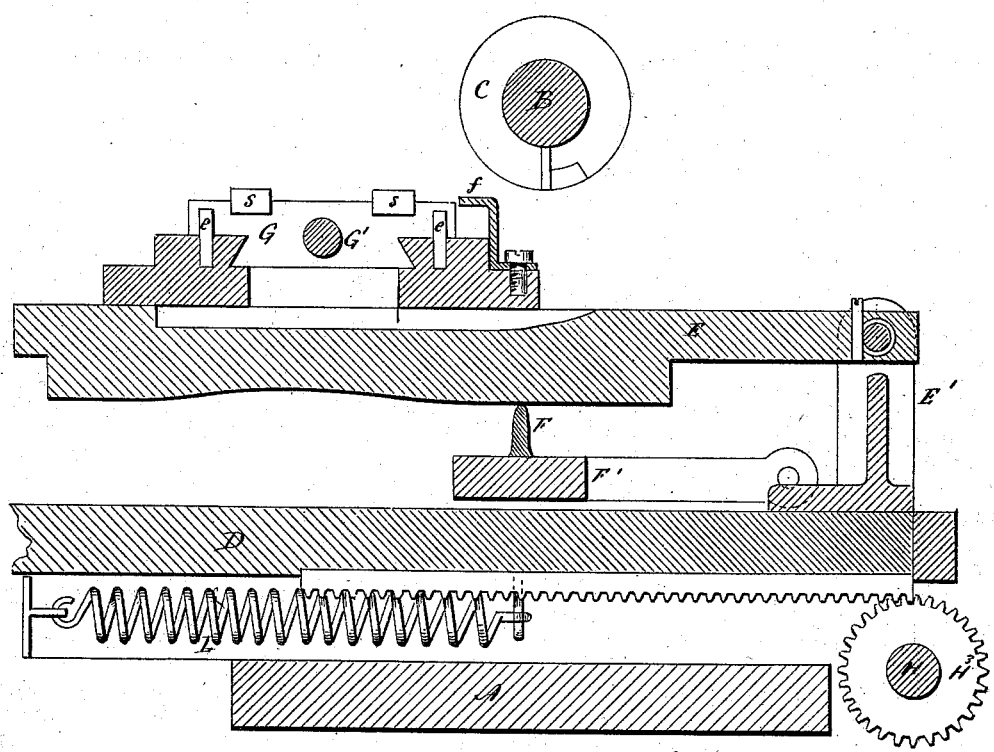
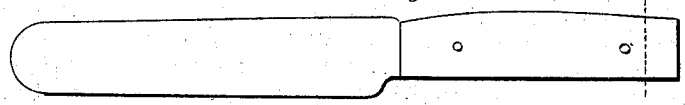
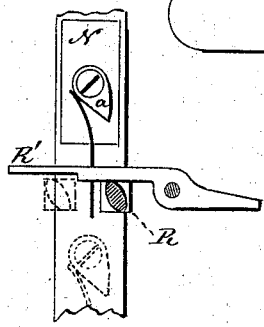

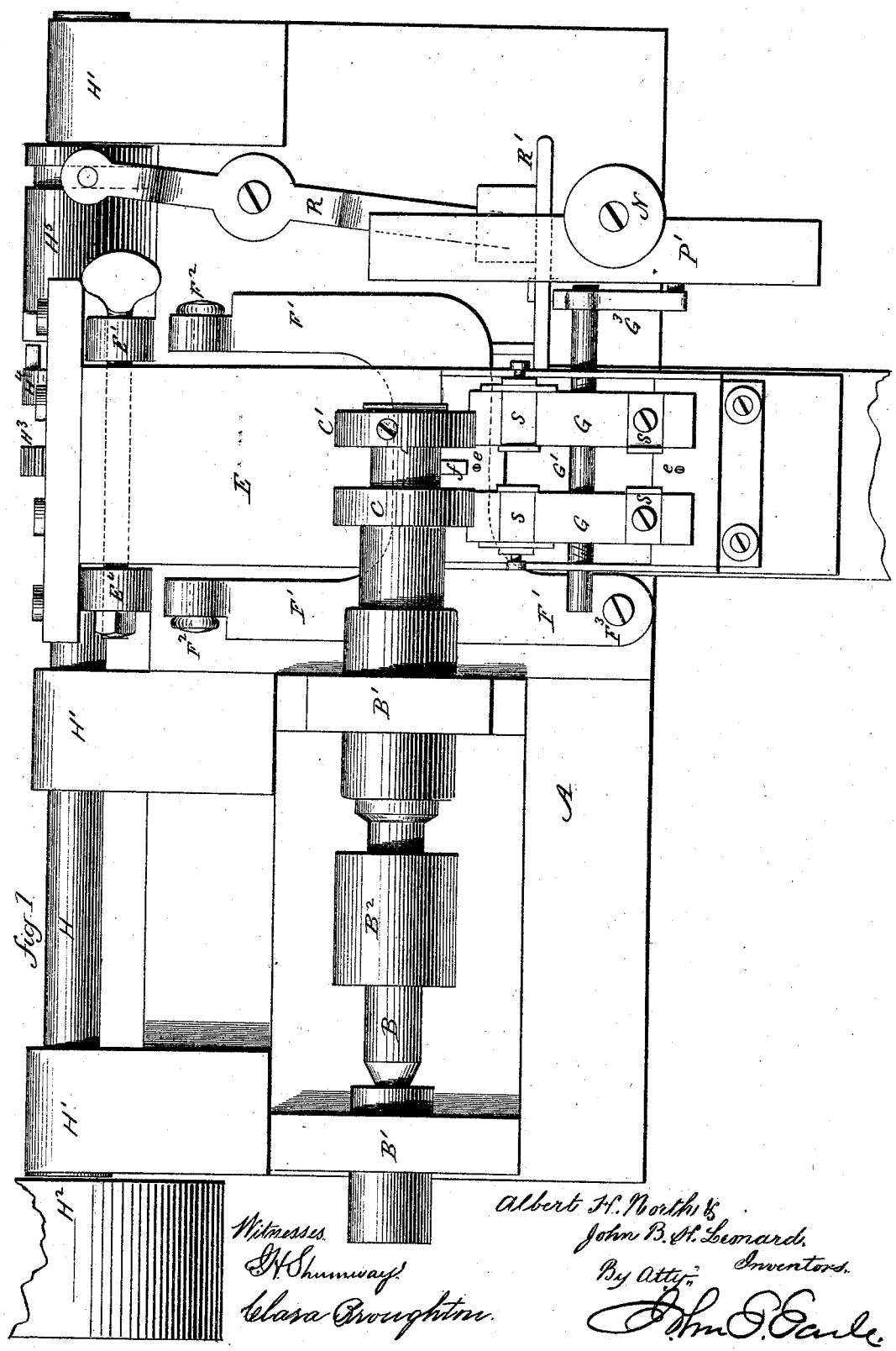

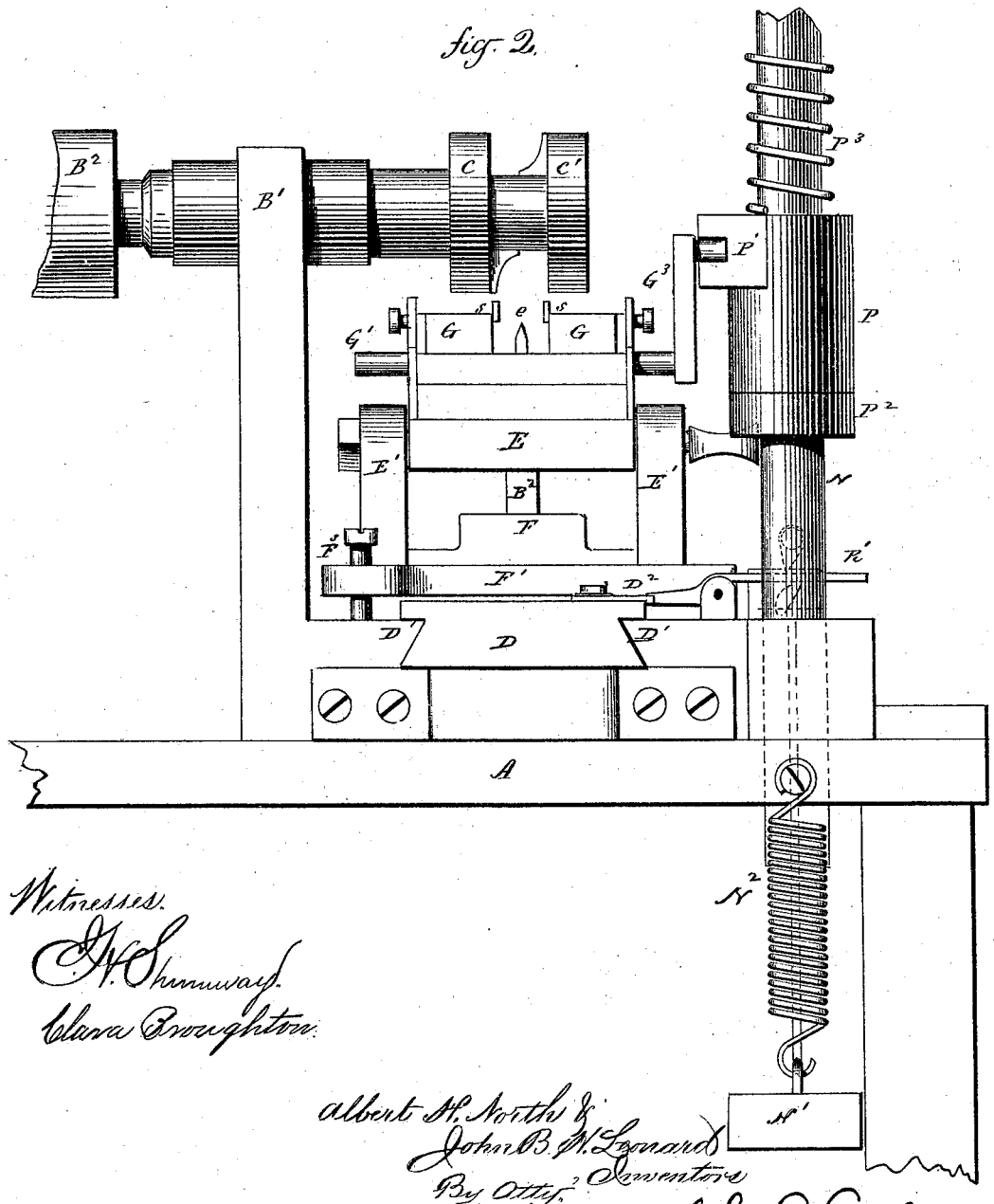

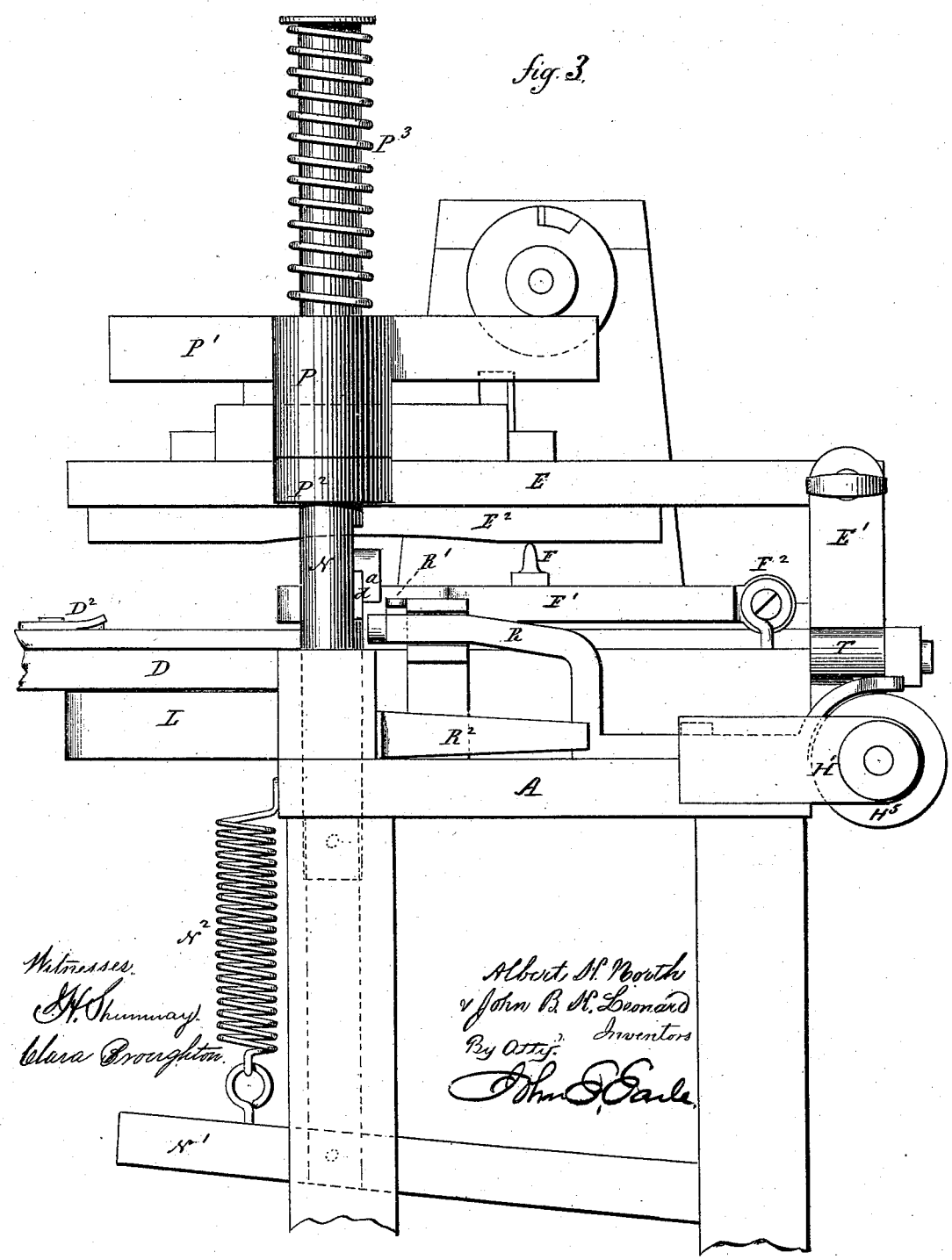

UNITED STATES PATENT OFFICE

ALBERT H. NORTH AND JOHN B. H. LEONARD, OF NEW BRITAIN, CONNECTICUT, ASSIGNORS TO LANDERS, FRARY & CLARKE, OF SAME PLACE.

IMPROVEMENT IN MACHINES FOR DRESSING CUTLERY-HANDLES.

Specification forming part of Letters Patent No. 173,807, dated February 22, 1876; application filed September 15, 1875.

*To all whom it may concern:*

Be it known that we, ALBERT H. NORTH and JOHN B. H. LEONARD, of New Britain, in the county of Hartford and State of Connecticut, have invented an Improvement in Machines for Dressing Cutlery-Handles; and we do hereby declare the following, when taken in connection with the accompanying four sheets of drawings and the letters of reference marked thereon, to be a full, clear, and exact description of the same, and which said drawings constitute part of this specification, and represent, in—

Figure 1, plan or top view; Fig. 2, front view; Fig. 3, end view; Fig. 4, transverse section; Fig. 5, detached view; Fig. 6, knife with one side of the handle dressed; Fig. 7, transverse section of the same.

This invention relates to the construction of a machine to dress or shape the edges of table-cutlery handles, particularly that class in which the tang is cut to the longitudinal outline of the handle, and a wood scale attached to each side. These scales are cut to nearly the longitudinal shape of the handle required, and when secured to the handle they are brought to the required shape by applying the handle to a sand-belt, to wear away, shape, and smooth the surface.

The object of this invention is the construction of a machine which will automatically shape the handles; and it consists in the mechanism as more fully hereinafter described, and as recited in the several claims.

A is the bed upon which the operative mechanism of the machine is arranged. B is the cutter-shaft, supported so as to revolve in suitable bearings, $B^1$, and the said shaft caused to revolve by the application of power thereto, through the pulley $B^2$, or otherwise; C C', the two parts of the cutter-head, more fully hereinafter described. D is a carriage, arranged to move transversely on the bed between guides D' and beneath the cutters. E is an auxiliary carriage, hinged between uprights $E^1$, extending up from the carriage D, so that the forward end of the auxiliary carriage E may be raised or lowered relatively to the principal carriage D. F is a guide supported on a plate, $F^1$, which is hinged to the bed near the rear, as at $F^2$, and extending to the front, where a screw, $F^3$, is arranged for raising or lowering the plate $F^1$, so as to adjust the elevation of the guide F. Upon the under side of the auxiliary carriage E a former, $E^2$, is longitudinally arranged, so that, as the carriage is moved transversely back and forth, the said former will pass over the stationary guide F, and thereby cause the auxiliary carriage E to rise and fall, according to the shape of the said former $E^2$. This former is the reverse of the shape of the handle to be produced, or rather the line of curvature of the former corresponds to the side of the handle being shaped. On the auxiliary bed E the holding mechanism is arranged, and consists of a pair of clamps, G G, arranged to be moved to and from each other by means of a right and left screw, $G^1$. Between these clamps the handle is set and clamped, and then the carriage pressed back beneath the cutters, guided vertically by the former $E^2$, and so that the cutters will dress the edge of the handle according to the shape of the former $E^2$. The cutter-head is for convenience formed in two parts, C C', and fitted with cutters of the shape required for the handle. One edge of the handle having thus been shaped, the carriage is drawn back, the handle turned over, and the other edge correspondingly shaped—that is, if both edges are to be of the same shape; if of different shapes, then, after a number have been dressed on one side, the former may be removed, and the other required former introduced, then the half-shaped handles successively replaced in an inverted position, and that edge accordingly shaped.

To work the carriage E so as to bring the handles to the cutters, the shaft H is arranged upon the rear of the machine in suitable bearings $H^1$, and caused to revolve by the application of power thereto through a pulley, $H^2$, or otherwise. On this shaft is a loose spur-gear, $H^3$, which works into a corresponding rack on the carriage D. In connection with this gear is one part, $H^4$, of a clutch, and on the shaft H the other part $H^5$ of the clutch is arranged with a spline, or otherwise, so as to revolve with the shaft, and this part $H^5$ is movable longitudinally on the shaft, so as to engage or disengage with the other part. When engaged, the revolution of the shaft H will, through the gear H³, draw the carriage backward beneath the cutter, as before described; but when the part H⁵ is disengaged, then the carriage is free from the shaft, and so soon as the clutch is thus disengaged a suitable spring, L, or, may be, a weight or other device, returns the carriage to the front, to receive or discharge the work.

In order to make the clamping of the handle and the engagement of the clutch simultaneous, or nearly so, or both be done at one operation, a vertical shaft, N, is arranged in connection with a treadle, N¹, a spring, N², serving to hold the treadle and the shaft up, but to yield as the treadle is depressed. On this vertical shaft is a sleeve, P, forming a part of a horizontal bar, P¹. This bar P¹ is parallel with the carriage, and with a groove on its face next the carriage. From the clamp-screw G¹ an arm, G³, extends, with a pin setting into the groove in the bar P¹. The sleeve P rests upon a collar, P², fast upon the shaft N, and above the sleeve is a spring, P³, which bears the sleeve down upon the said collar.

When the treadle is depressed so as to draw down the shaft N, the connection through the grooved bar P¹ causes the turning of the clamp-screw sufficiently to securely clamp the handle; but should the pressure upon the treadle be greater than that required for a proper clamping of the handle, then the spring P³ will yield so as to allow the bar P¹ to stop at such time, while the shaft is drawn farther down.

When the shaft N is thus depressed a cam, a, on the shaft strikes the end of the clutch-lever R, and turns the lever so as to throw the clutch into connection with and turn the gear H³, and when thus thrown into gear the latch R¹ catches and holds the lever. This latch R¹ is tripped, so soon as the carriage has been moved the required distance, by means of a shoe, D², on the carriage, which strikes the inner end of the latch, and throws it from its connection with the lever. When thus released, the lever and clutch are thrown back by a spring, R², and then the carriage returns to the front; then removing the foot from the treadle, the clamps will be opened and the handle released.

The cam a, as shown in Fig. 4, is pivoted to the shaft, and with a spring, d, bearing upon it, so that after the lever has been thrown back out of gear, the cam will, when the shaft ascends, freely pass the end of the lever.

In that class of handles in which the tang is the full width of the handle, it is desirable to use that tang as a guide in setting the handle into the clamps. For this purpose two pins, e, are arranged centrally between the clamps, no thicker than the tang itself, and so that they will set into the space between the edges of the scales, which project beyond the tang. These pins are made adjustable vertically, so that the tang resting upon these two pins forms a bearing or guide upon which to set the handle, and at the rear a stop, f, is arranged, to govern the position of the handle longitudinally.

The clamps are each provided with adjustable jaws S, to properly grasp the sides or surface of the handle.

In order to arrest the forward movement of the carriage without too much jar or strain, the carriage is provided with elastic bumpers T.

The several parts of the machine are made adjustable for different works, substantially as shown, and in the usual manner for such class of machinery, too well known to persons skilled in the construction and use of such machinery to require particular description.

Instead of the cutters, a grinder may be substituted; therefore, by the expression cutters I wish to be understood as including any suitable device for dressing the handle.

We do not wish to be understood as broadly claiming a machine in which are combined a reciprocating carriage for holding the article to be dressed, and a former for guiding the movement of the said carriage relatively to the cutter which is to dress the article, so that the said dressing will correspond to the said former: as such, we are aware, is not new.

We are aware that a reciprocating carriage, provided with means to hold an article to be shaped, and a stationary revolving cutter, with guides to govern the relative position of the thing to be shaped to the cutters, is not new. We, therefore, do not wish to be understood as claiming such construction.

We claim—

1. In a machine for dressing cutlery-handles, the combination of the reciprocating carriage E, the clamps G to grasp longitudinally the opposite faces of the handle, the revolving cutter with its axis arranged at right angles to the carriage and clamps, the former E², and bearing F, all substantially as described.

2. In a machine for dressing cutlery-handles, the combination of the principal carriage D, the reciprocating carriage E, the longitudinal clamps G, the revolving cutter with its axis at right angles to the said carriage, the former E² and bearing for the same, the toothed rack on the carriage, the pinion H³ on the driving-shaft, and spring for returning the carriage, with an automatic clutch, H⁴ and H⁵, substantially as described.

3. In a machine for dressing cuttlery-handles, the combination of a reciprocating carriage, clamps on said carriage to grasp and rigidly hold the handle, and arranged so that the movement of the carriage shall be in the direction of the length of the handle, a revolving cutter, the axis of which is at right angles to the movement of the handle to be dressed, a former parallel with the path of said carriage, and corresponding to the finished shape of the handle, with the screw G¹ and the vertically-reciprocating horizontal bar P¹ for the purpose of opening and closing said clamps, the combination and arrangement being substantially as described.

4. In a machine for dressing cutlery-handles, the combination of a reciprocating carriage, clamps on said carriage to grasp and rigidly hold the handle, and arranged so that the movement of the carriage shall be in the direction of the length of the handles, a revolving cutter, the axis of which is at right angles to the movement of the handle to be dressed, a former parallel with the path of said carriage, and corresponding to the finished shape of the handle, with the screw $G^1$ and the vertically-reciprocating horizontal bar $P^1$ for the purpose of opening and closing said clamps, the vertical shaft N on which said bar $P^1$ is arranged, and a spring to allow the self-adjustment of said bar, the combination and arrangement being substantially as described.

5. In a machine for dressing cutlery-handles, the combination of the clamps for holding the handle relatively to the cutter, as described, the studs $e\ e$ arranged in longitudinal central line between the said clamps, and a former to present the handle, supported on said studs, to the cutter, the combination and arrangement being substantially as specified.

6. The combination of the principal reciprocating carriage D, the auxiliary carriage E hinged thereto, the stationary adjustable guide F, the former $E^2$, the clamping device on said auxiliary carriage, and the cutter, substantially as described.

7. The combination of the clamps on the reciprocating carriage, the clamping-screw, the bar $P^1$ in connection with the said clamping-screw, the cam $a$, and the clutch or shipping-lever R, with the treadle, substantially as and for the purpose described.

8. The combination of the clamps on the reciprocating carriage, the clamping-screw, the bar $P^1$ in connection with the said clamping-screw, the cam $a$, and the clutch or shipping lever R, with the treadle, and with the stationary latch $R^1$ and shoe $D^2$ on the carriage, substantially as and for the purpose described.

ALBERT H. NORTH.
JOHN B. H. LEONARD.

Witnesses:
JAMES D. FRARY,
CHAS. L. SANDERS.